US006004421A

United States Patent [19]

Landa

[11] Patent Number: 6,004,421

[45] **Date of Patent: *Dec. 21, 1999**

[54] PRINTING AND ASSEMBLING LARGE POSTERS

[75] Inventor: Benzion Landa, Nes Ziona, Israel

[73] Assignee: Indigo N.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,422

[22] PCT Filed: Jun. 6, 1995

[86] PCT No.: PCT/NL95/00196

§ 371 Date: Jun. 5, 1997

§ 102(e) Date: Jun. 5, 1997

[87] PCT Pub. No.: WO96/13825

PCT Pub. Date: May 9, 1996

[30] Foreign Application Priority Data

Oct. 28, 1994 [IL] Israel ........................................ 111439

[51] Int. Cl.$^{6}$ ............................. B32B 31/00; G09F 15/02

[52] U.S. Cl. ............................ 156/258; 156/63; 156/263; 156/277; 156/299; 156/300; 156/304.1; 83/32; 428/58; 40/624; 270/1.01; 101/483; 101/485

[58] Field of Search .............................. 156/63, 263, 299, 156/277, 258, 300, 304.1, 267; 428/33, 58; 273/157 R; 40/624; 83/32, 29, 53; 270/1.01, 58.01, 58.23, 58.07; 101/483, 485

[56] References Cited

U.S. PATENT DOCUMENTS

| | | | |
|---|---|---|---|
| 741,746 | 10/1903 | Walker | 156/263 |
| 3,716,432 | 2/1973 | Morrison | 156/299 |
| 4,089,722 | 5/1978 | Holoubek | 156/299 |
| 4,244,769 | 1/1981 | Tracy | 156/300 |
| 4,362,591 | 12/1982 | Tracy | 156/300 |
| 5,676,785 | 10/1997 | Samonides | 156/244.11 |

FOREIGN PATENT DOCUMENTS

| | | |
|---|---|---|
| 2656712 | 7/1991 | France . |

*Primary Examiner*—Curtis Mayes
*Assistant Examiner*—Linda L. Gray
*Attorney, Agent, or Firm*—Greenblum & Bernstein, P.L.C.

[57] ABSTRACT

A method of producing sub-images for use in forming a larger image from a series of the sub-images. The method includes printing each of the sub-images of the series of sub-images and a portion of the larger image surrounding the sub-image on a separate sheet of material. Each sub-image is printed on the same location on the respective sheet. Then the sheets are cut to the size and shape of the sub-images. When the sub-images are positioned to form the larger image, the sub-images are in a non-overlapping and contiguous relationship.

24 Claims, 3 Drawing Sheets

PRINTING AND ASSEMBLING LARGE POSTERS

FIELD OF THE INVENTION

The present invention relates to creating large printed images using a relatively small printing press.

BACKGROUND OF THE INVENTION

While there are many uses for large printed images, especially for advertising, there are no satisfactory and inexpensive methods for accurately producing them without a special purpose printing press which is generally expensive.

One method used for printing large images, is to use a specialized printing press capable of handling large sheets of paper. The image is divided up into parts, each as large as the press can handle, or the entire image is printed on one sheet. Generally a press which can handle media having a width equal to the width of the final image is used so that matching need be done in only one direction. The different parts of the image are then printed and the image is created by accurately manually cutting or matching each page along premarked lines and then assembling the parts together manually.

There are several shortcomings to using this method. First, a large special purpose printing press, capable of handling large sheets of printing media must be used. Second, the media must be accurately cut and fitted together manually in order to create the very large sizes of printed images. The reason manual cutting and fitting is needed is that most printing methods leave an unprinted margin around the printed portion of the media. The width of the unprinted margin and the exact placement of the image is unknown before the actual printing.

Another method that can be used to print large images is to use a regular printing press, and then fit together a very large number of small pieces which are cut from the printed images which make up a large image. This method is uneconomical owing to the large amount of work needed to register, cut and paste the pieces together, and the resulting large image is seldom satisfactory.

SUMMARY OF THE INVENTION

The present invention seeks to solve the above mentioned problems. The process of the invention requires a printing press capable of printing on sheets much smaller than the final large image and does not require a large amount of manual labor in order to assemble the final image.

In a preferred embodiment of the invention, a large image is divided into sub-images each of which is smaller than the size of an image that a digital printing press can print. Segments of the large image are printed so that each printed segment is larger than the size of the sub-images and each segment contains a printed border which duplicates the image printed on adjacent segments by a known and constant amount. It should be noted that each printed image segment incorporates one sub-image but is larger than the dimensions of the sub-images which make up the final large image.

The image segments are printed, preferably sequentially and a set of sheets of media containing all the image segments is stacked and cut accurately to the size of the sub-images into which the large image was divided. So long as the position of each segment on the sheet of media is the same (e.g., the margins are repeatable from segment to segment), it is not necessary to accurately position any of the individual segments when they are cut, or even to accurately position the cuts with respect to any edge. All that is required is that all of the media containing the segments be accurately cut at the same distance from the margins to the exact size of the sub-images. Die cutting is especially suitable for cutting the sub-images from the sheets of media. When these cut sub-images are butted together they create the desired image with no overlap or mismatches.

In a digital printing press, such as the E-Print™ 1000 series of digital printers manufactured and distributed by Indigo, N.V. of Holland, the position of the image for sequential images can be can be held constant to a high degree of accuracy with respect to the edges of the media. Generally, printing systems using plates, which are replaced between images, do not yield images positioned to the required accuracy.

BRIEF DESCRIPTION OF THE DRAWINGS

The present invention will be understood and appreciated more fully from the following detailed description, taken in conjunction with the drawings in which.

DESCRIPTION OF THE PREFERRED EMBODIMENT OF THE INVENTION

Figure 1:
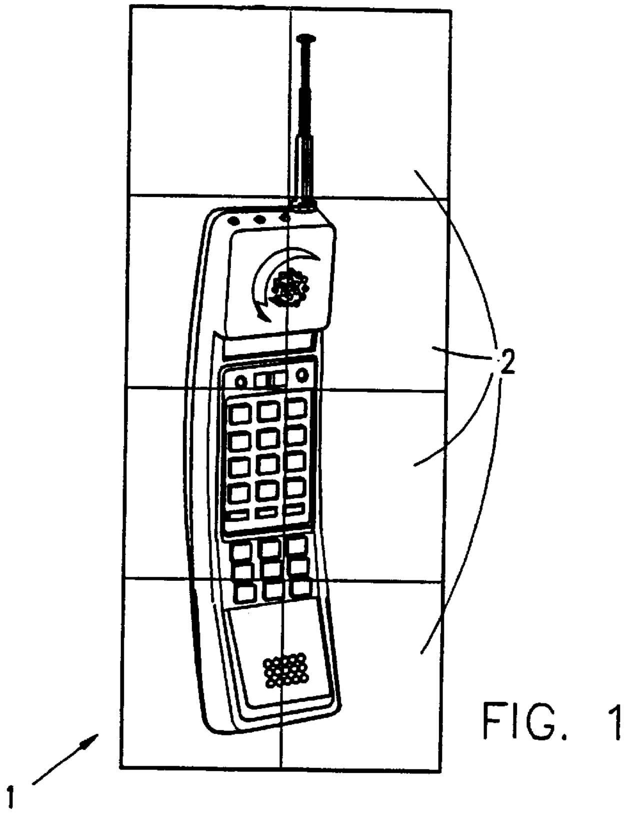
FIG. 1 shows a portion of a large image segmented into sub-images.

In a first step of the process of producing a large image, an original image 1 is logically divided into a plurality of non-overlapping identically sized sub-images 2 as shown in FIG. 1. The dimensions of each sub-image 2 is smaller than the image dimensions that a printing press can print on a page.

The shape of sub-image 2 is preferably a parallelogram, more preferably a rectangle, and it must fit comfortably (with printed margins on all four edges) within the printed area of the page.

Figure 2:
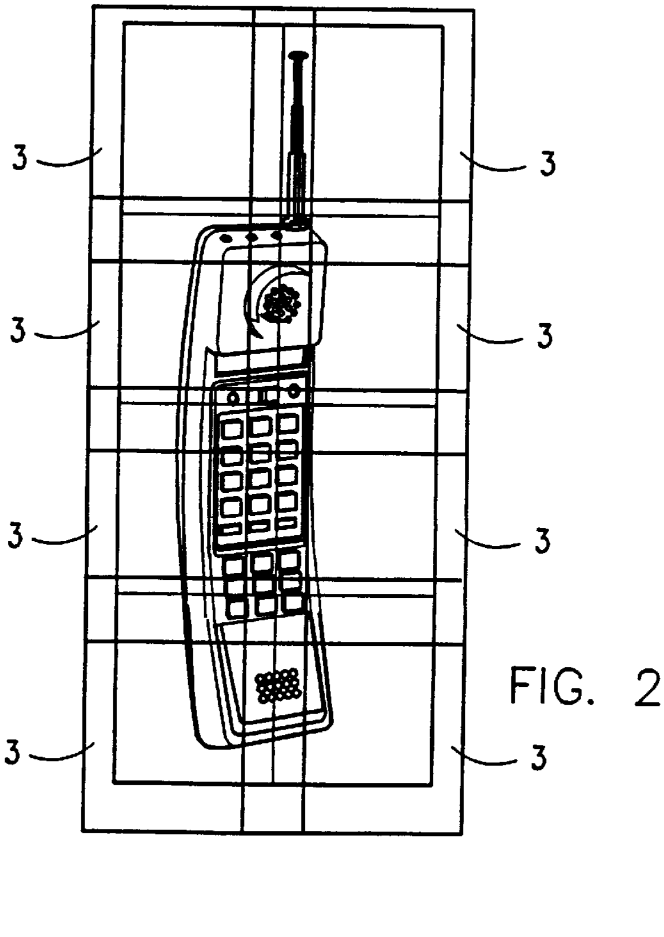
FIG. 2 shows the same image portion as shown in FIG. 1 with segments of the large image to be printed indicated thereon.

In a second step of the process, a plurality of segments 3 of the image (as shown in FIG. 2) are determined, where each segment will subsequently be printed on a separate sheet of media by the printing press.

It should be noted that each segment includes one sub-images image and that the boundaries of each segment have generally the same positional relationship to their respective sub-images. Each segment should be larger than its sub-image with printed margins adequate to accommodate the cutting process described below.

Figure 3:
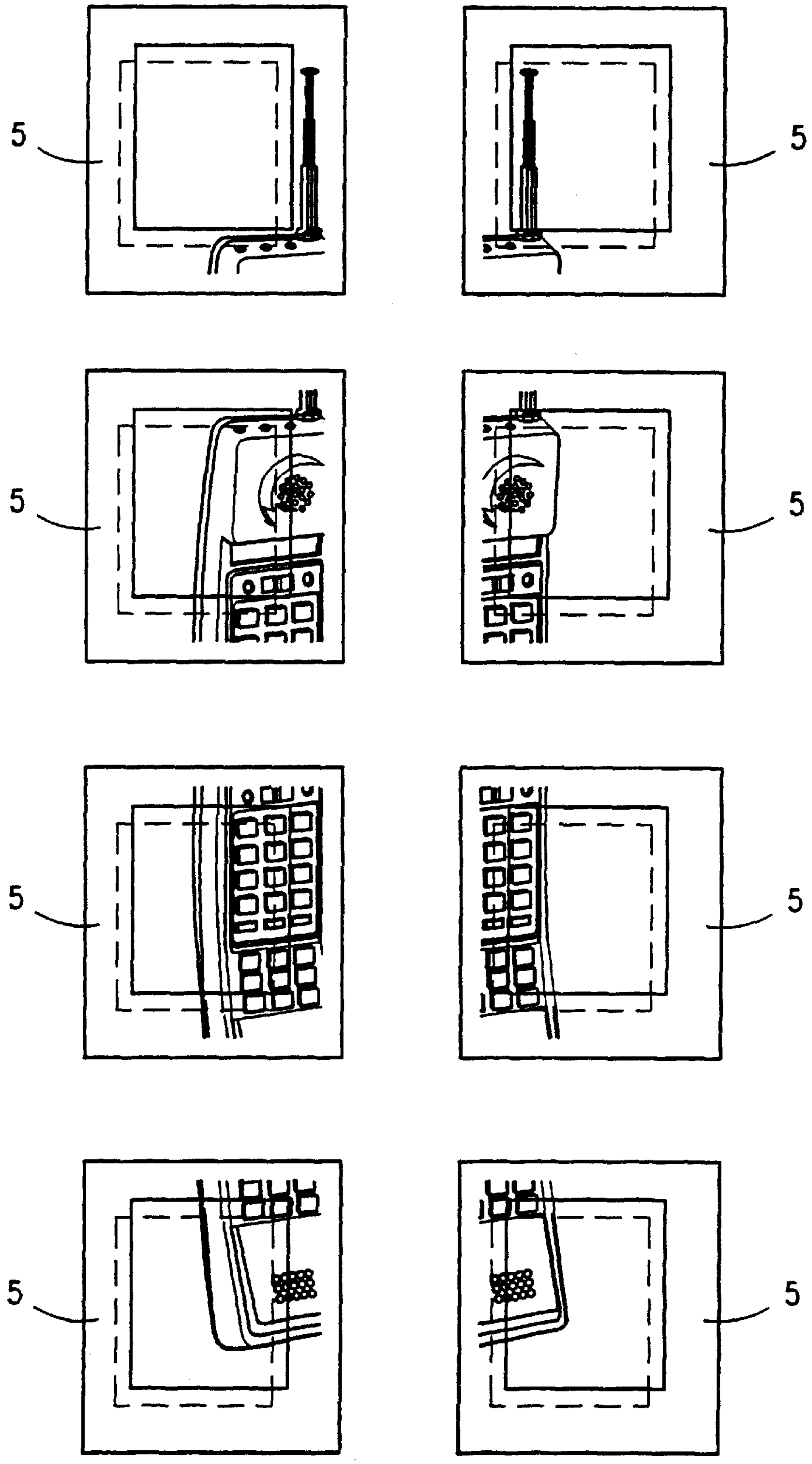
FIG. 3 show four printed pages containing adjacent sub-images with two possible cutting lines.

In a third step of the process, illustrated generally by a group of printed pages 5 shown in FIG. 3, all of the segments are printed on media each in the same position on its sheet. This assures that the sub-images are also placed in the same position on the sheets.

In the fourth step of the process, all the pages 5 are piled up and cut in the shape and exact size of the sub-images, resulting in a stack of sub-images.

Before cutting the pages their edges must exactly aligned, and they must have the same orientation. Furthermore, the cuts should be made on the printed portion of the page, so that the cut out sub-images will be printed in their entirety. Finally, the cuts must correspond to the exact size of the sub-images.

It should be noted that it is not necessary to cut the pages to correspond with the exact sub-images decided in the first step of the process. So long as the final cut dimensions of the media are the same as those of the sub-images originally decided upon, the overall image will be complete without overlap and without spaces. FIG. 3 illustrates two sets of cutting lines referenced respectively by solid and dashed lines, each of which will give a gap-free and overlap-free image. There is a slight lateral movement of the overall image between the two sets of cut lines, however, such movement of one or a few millimeters is seldom important in a large mural-type image.

In a fifth step of the process, the cut sub-images are placed on a surface in their correct relative locations and orientations, are butted together and are attached to the surface, for example by gluing. Alternatively, the cut sub-images may be placed face-down on a surface, butted together in their correct orientations and relative locations and glued to a backing sheet which is placed on the back of the aligned image. The front of the sub-images may be attached to a clear substrate and the backing layer may be dispensed with, or the front of a large image which is attached to a backing layer may be protected by coating it with a clear protective layer or a clear sheet of protective material.

It should be noted that no visual matching of the sub-images is required and no accurate cutting of the individual images along predetermined cut-lines is required.

The present invention avoids the problems present in prior methods of forming large images from many small pieces which made those methods impractical, such as exact cutting of each sub-image along predetermined lines. This method of cutting is necessary when the margins of the image are not all the same or where the different images cannot be consistently placed on the printed page. The present invention is based on an accurate placement of sequential segments on their respective printed pages as is possible, for example in a digital printing press, such as the preferred E-Print™ 1000 series of digital printers manufactured and distributed by Indigo, N.V. of Holland, and on the fact that it is much simpler to cut stacks of paper to an exact size than to cut individual pages along an exact line. Since a whole stack of pages is cut together, the position of the sub-images can be held constant to a high degree of accuracy.

Figure 4:
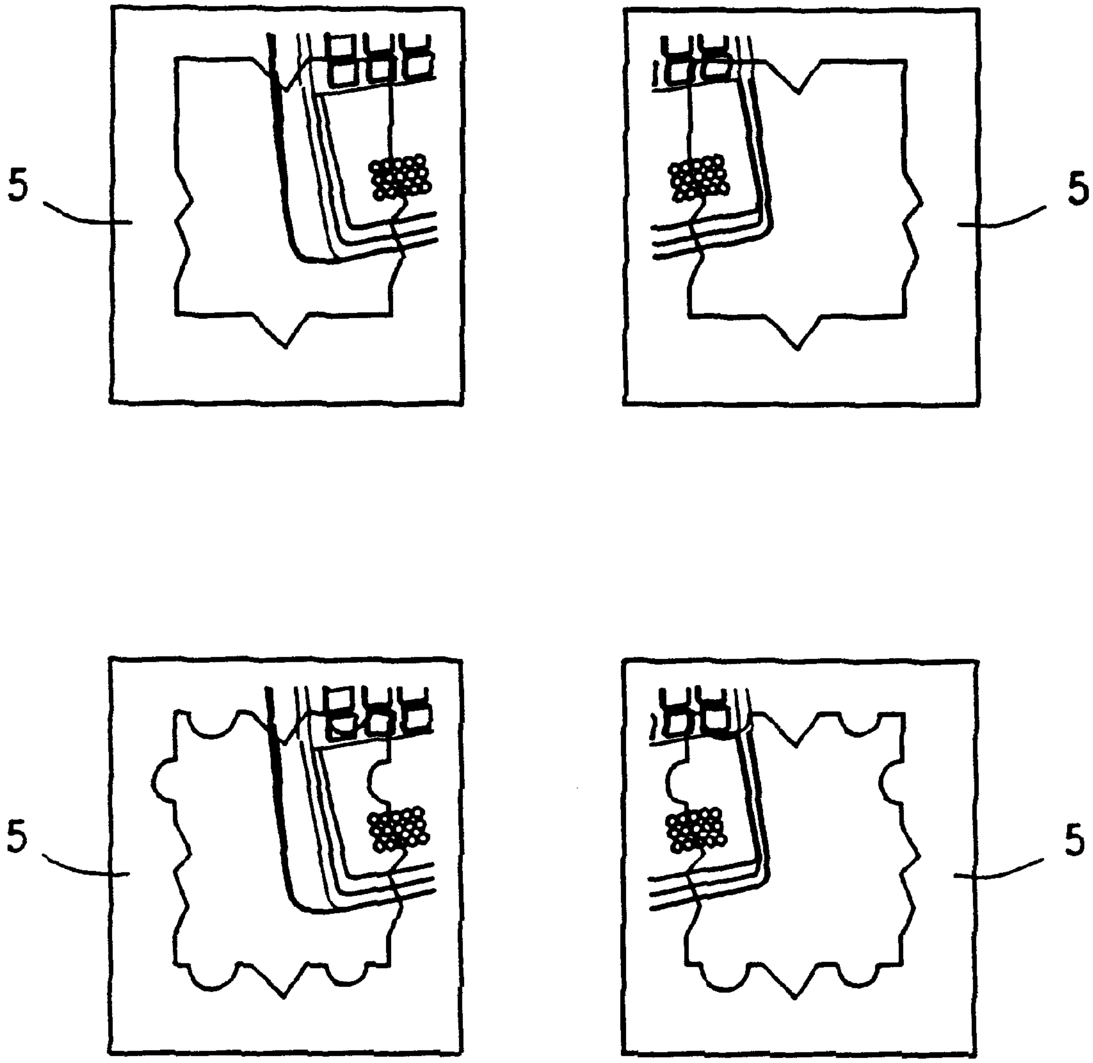
FIG. 4 shows alternative, non-rectangular shaped subimages useful in the practice of the invention.

While in the preferred embodiment of the invention, rectangular sub-images are illustrated, non-rectangular sub-images which may be easier to align may be used. Several of such shapes is shown in FIG. 4. Such shapes would generally be cut using a die. If a die is used, and the pages can be accurately placed in the die cutter, the pages may be cut individually. This may be useful if thick stock is used for the media.

Furthermore, if the segments are printed on pre-perforated media, with the perforated area having the size of the sub-images (either rectangular or other shapes), the cutting step realized by the removal of the perforated margins to yield the desired sub-images.

While paper is a suitable media for use in the present invention, other media can be used. Preferably, the media should be dimensionally stable and should be capable of being cut accurately so that accurate sub-images are obtained.

What is claimed:

1. A method of producing sub-images for use in forming a larger image from a series of said sub-images, each said sub-image having the same size and shape, wherein to form said larger image said sub-images are positioned with respect to each other so that they are non-overlapping and contiguous, comprising:

printing each said sub-image of said series of sub-images and a portion of said larger image surrounding said sub-image on a separate sheet of suitable material wherein each said sub-image is accurately positioned relative to at least two edges of said sheet so that each said sub-image is positioned on the same location on each said separate sheet with respect to said at least two edges; and cutting all of the sheets to the size and shape of the sub-images, such cutting being accurately related to said at least two edges.

2. A method according to claim 1 wherein cutting all of the sheets comprises stacking the sheets and cutting them together.

3. A method according to claim 2 wherein cutting all of the sheets comprises die cutting the sheets to the size and shape of the sub-images.

4. A method according claim 3 wherein the sub-images are substantially rectangular.

5. A method according to claim 3 wherein the sub-images are not rectangular.

6. A method according to claim 5, wherein the sub-images have at least one edge which is formed to mechanically interlock with an adjoining edge of an adjacent sub-image.

7. A method according claim 2 wherein the sub-images are substantially rectangular.

8. A method according to claim 2 wherein the sub-images are not rectangular.

9. A method according to claim 8, wherein the sub-images have at least one edge which is formed to mechanically interlock with an adjoining edge of an adjacent sub-image.

10. A method according to claim 1 wherein cutting all of the sheets comprises die cutting the sheets to the size and shape of the sub-images.

11. A method according claim 10 wherein the sub-images are substantially rectangular.

12. A method according to claim 10 wherein the sub-images are not rectangular.

13. A method according to claim 12, wherein the sub-images have at least one edge which is formed to mechanically interlock with an adjoining edge of an adjacent sub-image.

14. A method according to claim 1 wherein the sub-images are printed on perforated sheets and wherein the cutting of the sheets comprises tearing the sheets along the perforations.

15. A method according claim 14 wherein the sub-images are substantially rectangular.

16. A method according to claim 14 wherein the sub-images are not rectangular.

17. A method according to claim 16, wherein the sub-images have at least one edge which is formed to mechanically interlock with an adjoining edge of an adjacent sub-image.

18. A method according claim 1 wherein the sub-images are substantially rectangular.

19. A method according to claim 1 wherein the sub-images are not rectangular.

20. A method according to claim 19, wherein the sub-images have at least one edge which is formed to mechanically interlock with an adjoining edge of an adjacent sub-image.

21. A method of forming a larger image comprising:

producing a series of sub-images according to claim 1;

positioning said sub-images with respect to each other so that they are non-overlapping and contiguous and form said larger image; and securing each said sub-image in its place with respect to the other sub-images.

22. A method according to claim 21 wherein securing each said sub-image comprises attaching the positioned sub-images to a backing sheet.

23. A method according to claim 21 comprising attaching a protective layer to the formed larger image.

24. A method of forming a larger image comprising:

producing a series of sub-images according to any one of claims 1–17;

positioning said sub-images with respect to each other so that they are non-overlapping and contiguous and form said larger image; and securing each said sub-image in its place with respect to the other sub-images.

* * * * *